(12) United States Patent
Talja et al.

(10) Patent No.: US 9,673,728 B2
(45) Date of Patent: Jun. 6, 2017

(54) CONVERTER ARRANGEMENT WITH A CAPACITANCE

(71) Applicant: ABB Technology Oy, Helsinki (FI)

(72) Inventors: Markku Talja, Jarvenpaa (FI); Veikko Hakala, Espoo (FI)

(73) Assignee: ABB Technology Oy, Helsinki (FI)

( * ) Notice: Subject to any disclaimer, the term of this patent is extended or adjusted under 35 U.S.C. 154(b) by 47 days.

(21) Appl. No.: 14/737,149

(22) Filed: Jun. 11, 2015

(65) Prior Publication Data

US 2015/0365012 A1 Dec. 17, 2015

(30) Foreign Application Priority Data

Jun. 12, 2014 (EP) ..................................... 14172148

(51) Int. Cl.
*H02M 7/06* (2006.01)
*H02M 1/36* (2007.01)

(52) U.S. Cl.
CPC ............. *H02M 7/062* (2013.01); *H02M 1/36* (2013.01)

(58) Field of Classification Search
CPC .......... H02M 1/36; H02M 7/06; H02M 7/062; H02M 7/08
See application file for complete search history.

(56) References Cited

U.S. PATENT DOCUMENTS

| | | | | |
|---|---|---|---|---|
| 5,982,648 A | * | 11/1999 | Wang | H02M 1/4208 363/125 |
| 2003/0043607 A1 | * | 3/2003 | Vinciarelli | H02M 1/4208 363/61 |
| 2008/0084718 A1 | * | 4/2008 | Ingman | H02M 7/125 363/53 |
| 2009/0284999 A1 | * | 11/2009 | Gibbs | H02M 7/062 363/65 |
| 2015/0222198 A1 | * | 8/2015 | Dourbal | H02M 7/06 363/126 |
| 2016/0172992 A1 | * | 6/2016 | Tallam | H02M 5/458 363/37 |

FOREIGN PATENT DOCUMENTS

| | | | | |
|---|---|---|---|---|
| EP | 2 533 409 A1 | 12/2012 | | |
| FR | 1 231 462 A | 9/1960 | | |
| JP | EP 1643631 A1 | * 4/2006 | ............. | H02M 1/36 |
| KR | EP 1755209 A1 | * 2/2007 | ............. | H02M 1/36 |

OTHER PUBLICATIONS

European Search Report for EP 14172148 dated Nov. 25, 2014.

* cited by examiner

*Primary Examiner* — Fred E Finch, III
(74) *Attorney, Agent, or Firm* — Taft Stettinius & Hollister LLP

(57) ABSTRACT

A converter arrangement can include a first rectifier having an AC input and a DC output with two DC output poles, a capacitance (C) connected between the DC output poles of the first rectifier, a second rectifier having an AC input with two AC input poles and a DC output with two DC output poles, wherein the DC output of the second rectifier is connected between the DC output poles of the first rectifier. A magnetic amplifier includes at least one control winding (L2) and at least one AC winding (L11, L12), wherein the at least one control winding is connected between the DC output poles of the first rectifier, and wherein the at least one AC winding (L2) of the magnetic amplifier is connected in series with the AC input of the second rectifier.

20 Claims, 1 Drawing Sheet

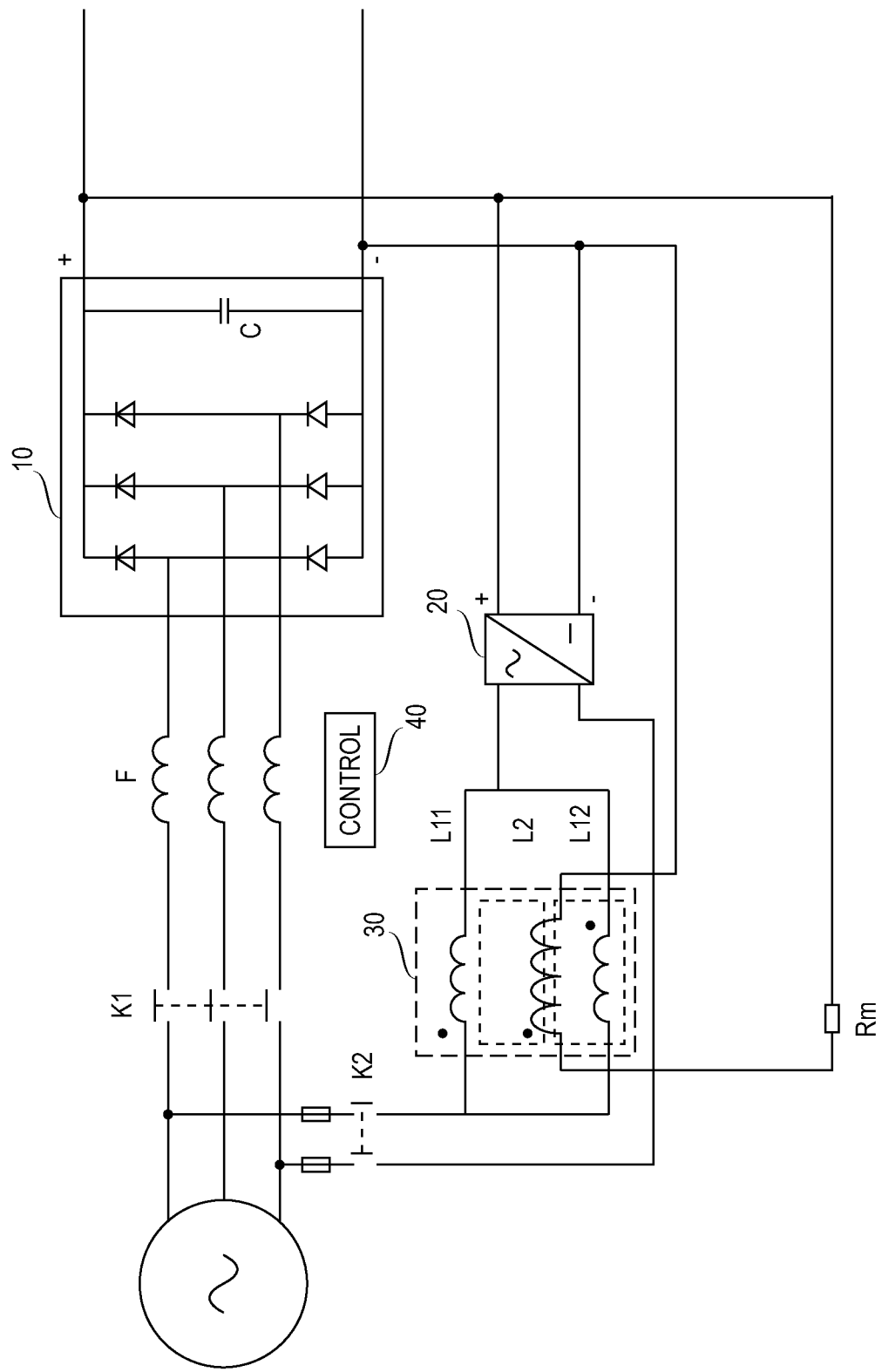

CONVERTER ARRANGEMENT WITH A CAPACITANCE

RELATED APPLICATION

This application claims priority under 35 U.S.C. §119 to European Patent Application No. 14172148.0 filed in Europe on Jun. 12, 2014, the entire content of which is hereby incorporated by reference in its entirety.

FIELD

The present disclosure relates to a converter arrangement and a method for charging a capacitance of the converter arrangement.

BACKGROUND INFORMATION

A converter, such as a rectifier or a combined rectifier/inverter, may have a capacitance connected between its DC (Direct Current) poles. One example of the rectifier is a diode bridge which obtains its supply from an AC (Alternating Current) source, which is a 50 or 60-Hz AC network, for instance. Such a rectifier may then feed for example, one or more inverters or other loads via a DC link.

The capacitance connected between the DC poles of the rectifier may need to be charged before the rectifier is connected to the AC network in order to avoid a current surge upon the connection. Such a current surge may trigger protection of the system or disturb feeding AC network, for example. The capacitance connected between the DC poles of the rectifier may be charged to or close to a normal operating value of the capacitance. Such a normal operating value of the capacitance may correspond to a full-wave rectified voltage of the AC network, for example.

Such a charging of the capacitance connected between the DC poles of the rectifier may be implemented by means of charging resistors by using one or more of the phases of the AC network. An issue related to the use of such charging resistors is that they need to be sized on a case-by-case basis. For example a cyclic use that requires frequent charging needs to be taken into account. In addition, such charging resistors may cause considerable losses during the charging.

Another possibility for charging of the capacitance connected between the DC poles of the rectifier is to implement the charging by using semiconductors. An issue with utilizing semiconductors is that the solution may become complex and expensive because the semiconductors need to be sized according to possibly high instantaneous charging current values.

SUMMARY

A converter arrangement is disclosed comprising: a first rectifier having an AC input and a DC output with two DC output poles; a capacitance connected between the DC output poles of the first rectifier; a second rectifier having an AC input with two AC input poles and a DC output with two DC output poles, wherein the DC output of the second rectifier is connected between the DC output poles of the first rectifier; and a magnetic amplifier having at least one control winding and at least one AC winding, wherein an alternating current through the at least one AC winding can be controlled by a direct current through the at least one control winding and wherein the at least one control winding of the magnetic amplifier is connected between the DC output poles of the first rectifier; wherein the at least one AC winding of the magnetic amplifier is connected in series with the AC input of the second rectifier.

A method is disclosed for charging a capacitance of a converter arrangement which includes a first rectifier having an AC input and a DC output with two DC output poles; a capacitance connected between the DC output poles of the first rectifier; a second rectifier having an AC input with two AC input poles and a DC output with two DC output poles, wherein the DC output of the second rectifier is connected between the DC output poles of the first rectifier; and a magnetic amplifier having at least one control winding and at least one AC winding, wherein an alternating current through the at least one AC winding can be controlled by a direct current through the at least one control winding and wherein the at least one control winding of the magnetic amplifier is connected between the DC output poles of the first rectifier; wherein the at least one AC winding of the magnetic amplifier is connected in series with the AC input of the second rectifier; the method comprising: connecting the series connection of the at least one AC winding of the magnetic amplifier and the AC input of the second rectifier between two poles of an AC supply.

BRIEF DESCRIPTION OF THE DRAWINGS

The invention will now be explained in greater detail in connection with preferred exemplary embodiments and with reference to the attached drawings, in which:

FIG. 1 shows a circuit diagram of a converter system according to an exemplary embodiment.

DETAILED DESCRIPTION

The present disclosure is directed to a method and apparatus which can use a second rectifier and a magnetic amplifier for charging a capacitance connected between the DC poles of a first rectifier.

Exemplary embodiments provide an advantage that the capacitance connected between the DC poles of the rectifier can be charged with smaller losses and with a simple structure.

Exemplary embodiments as disclosed herein are not restricted to any specific system, but may be applied to various converter systems. In addition, methods disclosed are not restricted to any system utilizing a specific basic frequency or to any specific voltage level.

FIG. 1 shows a circuit diagram of a main circuit of a converter arrangement according to an exemplary embodiment. It should be noted that the FIGURE merely illustrates components necessary for understanding novel aspects disclosed herein. The number of various components may vary from that shown in the FIGURE.

The exemplary FIG. 1 converter arrangement includes a first rectifier 10 having an AC input and a DC output. While the first rectifier 10 can be any type of rectifier, in the example of FIG. 1 the first rectifier 10 is a three-phase rectifier with three AC input poles and two DC output poles. The first rectifier 10 may be a diode rectifier, for example, as shown in the example of FIG. 1 implemented with a bridge connection of six diodes. There can be an input filter F connected to the AC input of the first rectifier 10 which filter may be an L filter or LCL filter, for example. In the example of FIG. 1, the converter arrangement includes first switching means K1 between the AC input of the first rectifier 10 and an AC supply, which enable the AC input of the first rectifier 10 to be connected to or disconnected from the AC supply.

In the example of FIG. 1, the AC supply is a three-phase AC supply, but the number of the phases can vary.

The exemplary converter arrangement includes a capacitance C connected between the DC output poles of the first rectifier 10. While in the example of FIG. 1 the capacitance C is located inside the first rectifier 10, it could also be located outside the first rectifier 10. The capacitance C can include one or more capacitors. Where the capacitance includes more than one capacitor, such capacitors can be located in separate locations. For example, some capacitors may be located inside devices, such as inverters, possibly supplied by the first rectifier 10.

The converter arrangement of FIG. 1 can include a charging circuit having a second rectifier 20 with an AC input with two AC input poles and a DC output with two DC output poles. The DC output of the second rectifier 20 is connected between the DC output poles of the first rectifier 10; i.e., a positive DC output pole of the second rectifier 20 is connected to a positive DC output pole of the first rectifier 10 and a negative DC output pole of the second rectifier 20 is connected to a negative DC output pole of the first rectifier 10. The second rectifier 20 can be any type of rectifier, such as a full-wave rectifier which may be implemented with diodes, for example.

The charging circuit of the converter arrangement of FIG. 1 can include a magnetic amplifier 30 having at least one control winding L2 and at least one AC winding L11, L12. In the example of FIG. 1, the magnetic amplifier 30 includes two AC windings L11, L12 connected in parallel with each other. According to an exemplary embodiment, the two AC windings L11, L12 are connected in parallel such that their polarities are opposite to each other as shown in the example of FIG. 1.

According to an exemplary embodiment, the at least one control winding L2 of the magnetic amplifier 30 is connected between the DC output poles of the first rectifier 10.

According to an exemplary embodiment, the converter arrangement includes an element, such as a resistance labelled "Rm" connected between the at least one control winding L2 of the magnetic amplifier and one of the DC output poles of the first rectifier 10. This is shown in the example of FIG. 1, where the control winding L2 of the magnetic amplifier 30 is connected between the DC output poles of the first rectifier 10 such that there is a resistance Rm between the control winding L2 and the positive DC output pole of the first rectifier 10. A suitable value of the possible resistance designated "Rm" in FIG. 1 depends on the system and can vary. Moreover, according to an embodiment, the at least one AC winding L11, L12 of the magnetic amplifier 30 is connected in series with the AC input of the second rectifier 20. Accordingly, in the example of FIG. 1, the two parallel-connected AC windings L11, L12 of the magnetic amplifier 30 are connected in series with the AC input of the second rectifier 20.

In the example of FIG. 1, the converter arrangement can include second switching means K2 between the end poles of the series connection of the at least one AC winding L11, L12 of the magnetic amplifier 30 and the AC input of the second rectifier 20 and the AC supply, which enable the series connection to be connected to or disconnected from the AC supply. There can further be one or more fuses between the AC supply and the second switching means K2, as shown in the FIGURE.

According to an exemplary embodiment, the charging of the capacitance C of the converter arrangement may be performed by connecting the series connection of the at least one AC winding L11, L12 of the magnetic amplifier 30 and the AC input of the second rectifier 20 between two poles of an AC supply. In the example of FIG. 1, this can be accomplished by controlling the second switching means K2 to be conductive (ON), whereby the end poles of the series connection are connected to two phase poles of the AC supply. For example, the first rectifier 10 is switched off during the charging of the capacitance C of the converter arrangement. In the example of FIG. 1, this can be accomplished by controlling the first switching means K1 to be non-conductive (OFF).

The magnetic amplifier 30 operates such that a current of the AC windings L11, L12 can be controlled by a direct current through the control winding L2. When the current through the control winding L2 is zero, an impedance of the AC windings L11, L12 is high. When the current through the control winding L2 begins to rise, the AC windings L11, L12 begin to let current through them with a phase-angle cutting as determined by saturation. In the example of FIG. 1, the voltage from the AC supply can thus be connected to the second rectifier 20 through the AC windings L11, L12 in a controlled manner. The second rectifier 20 in turn rectifies the supplied AC voltage and supplies the capacitance C connected between the DC output poles of the first rectifier 10 with the rectified DC voltage. In the example of FIG. 1, the control winding L2 is fed with a current from the DC output poles of the first rectifier 10 via the resistance Rm.

When the second switching means K2 is controlled to be conductive (ON) and thus the charging begins, the voltage of the capacitance C is initially essentially zero and, in consequence, impedance of the AC windings L11, L12 is high. This impedance of the AC windings L11, L12 is for example configured to a suitable value required by an initial charging current. When the voltage of the capacitance C begins to rise, the current through the control winding L2 also begins to rise and the impedances of the AC windings L11, L12 begin to decrease. This makes the charging event more linear even though the difference between a rectified voltage from the AC supply and the voltage of the capacitance C is decreasing. According to an exemplary embodiment, when the voltage of the capacitance C reaches a predetermined threshold value, the charging can be stopped. In the example of FIG. 1, this can be accomplished by controlling the second switching means K2 to be non-conductive (OFF). After charging, the first rectifier 10 can be switched on. In the example of FIG. 1, this can be accomplished by controlling the first switching means K1 to be conductive (ON).

According to an exemplary embodiment, the element designated "Rm" connected between the at least one control winding L2 of the magnetic amplifier and one of the DC output poles of the first rectifier 10 may be a controllable semiconductor switch, such as an IGBT (Insulated Gate Bipolar Transistor) or a corresponding current-limiting element or arrangement. With a controllable semiconductor switch, the charging current of the capacitance C can be controlled more accurately.

According to an exemplary embodiment, the first and/or second switching means K1, K2 may be controlled manually by an operator of the converter arrangement. The control of the first and/or second switching means K1, K2 may also be performed automatically. For this, a control arrangement 40 may be provided, which is configured to control the switching means K1, K2. Such a control arrangement 40 or a corresponding entity may be part of the first or the second rectifier 10, 20 or a separate arrangement, for example. Such a control arrangement 40 or a corresponding entity may further control the possible controllable semiconductor switch and thus control the charging. It is also possible to use additional or separate logical or physical units (not shown) for performing the control functionality disclosed herein.

The control arrangement 40 according to any of the embodiments disclosed herein, or any combination thereof, can be implemented as one unit or as two or more separate units that are configured to implement the functionality of the various embodiments. Here the term 'unit' refers generally to a physical or logical entity, such as a physical device or a part thereof or a software routine. The control arrangement 40 according to any of the embodiments may be implemented at least partly by means of one or more computers or corresponding digital signal processing (DSP) equipment provided with suitable software, for example. Such a computer or digital signal processing equipment can, for example, include at least a working memory (RAM) providing storage area for arithmetical operations, and a central processing unit (CPU), such as a general-purpose digital signal processor. The CPU may include a set of registers, an arithmetic logic unit, and a CPU control unit. The CPU control unit is controlled by a sequence of program instructions transferred to the CPU from the RAM. The CPU control unit may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler.

The computer may also have an operating system which may provide system services to a computer program written with the program instructions. The computer or other apparatus implementing features disclosed herein, or a part thereof, may include suitable input means (e.g., human interface or data source) for receiving measurement and/or control data, for example, and output means (e.g., visual, audible and so forth), for outputting control data, for example.

It is also possible to use analog circuits, programmable logic devices (PLD), or discrete electric components and devices for implementing the functionality according to any of the disclosed embodiments. For example, the control arrangement 40 according to any of the embodiments may be implemented at least partly by means of such analog circuits or programmable logic devices.

Exemplary embodiments can be implemented in existing system elements or by using separate dedicated elements or devices in a centralized or distributed manner. Present converter devices, for example, can include programmable logic devices, or processors and memory that can be utilized in the functions according to embodiments disclosed herein. Thus, all modifications and configurations required for implementing an embodiment in existing converters, for example, may be performed as software routines, which may be implemented as added or updated software routines. If at least part of the functionality disclosed herein is implemented by software, such software can be provided as a computer program product having computer program code which, when run on a computer, causes the computer or a corresponding arrangement to perform the functionality according described herein. Such a computer program code may be stored or generally embodied on a computer readable medium, such as a suitable memory, e.g. a flash memory or an optical memory, from which it is loadable to the unit or units executing the program code. In addition, such computer program code implementing the embodiments may be loaded to the unit or units executing the computer program code via a suitable data network, for example, and it may replace or update a possibly existing program code.

It will be apparent to those skilled in the art that, as technology advances, the basic ideas disclosed herein may be implemented in various ways. The invention and its embodiments are thus not restricted to the above examples but may vary within the scope of the claims.

Thus it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A converter arrangement comprising:
   a first rectifier having an AC input and a DC output with two DC output poles;
   a capacitance connected between the DC output poles of the first rectifier;
   a second rectifier having an AC input with two AC input poles and a DC output with two DC output poles, wherein the DC output of the second rectifier is connected between the DC output poles of the first rectifier; and
   a magnetic amplifier having at least one control winding and at least one AC winding, wherein an alternating current through the at least one AC winding is controlled by a direct current through the at least one control winding and wherein the at least one control winding of the magnetic amplifier is connected between the DC output poles of the first rectifier;
   wherein the at least one AC winding of the magnetic amplifier is connected in series with the AC input of the second rectifier.

2. The converter arrangement of claim 1, comprising:
   a resistance connected between the at least one control winding of the magnetic amplifier and one of the DC output poles of the first rectifier.

3. The converter arrangement of claim 1, comprising:
   a controllable semiconductor switch connected between the at least one control winding of the magnetic amplifier and one of the DC output poles of the first rectifier.

4. The converter arrangement according to claim 3, wherein the magnetic amplifier comprises:
   two AC windings connected in parallel with each other.

5. The converter arrangement according to claim 4, wherein the magnetic amplifier comprises:
   only one control winding.

6. The converter arrangement according to claim 5, wherein the first rectifier is a three-phase rectifier having three AC input poles.

7. The converter arrangement according to claim 6, wherein the second rectifier is a full-wave rectifier.

8. The converter arrangement according to claim 7, comprising:
   a first rectifier switch between the AC input of the first rectifier and AC supply input lines of the first rectifier; and
   a filter in series with the switch.

9. The converter arrangement according to claim 8, comprising:

a second rectifier switch between the at least one AC winding of the magnetic amplifier and AC supply input lines of the magnetic amplifier.

10. The converter arrangement according to claim 1, wherein the magnetic amplifier comprises:
two AC windings connected in parallel with each other.

11. The converter arrangement according to claim 1, wherein the magnetic amplifier comprises:
only one control winding.

12. The converter arrangement according to claim 1, wherein the capacitance comprises:
one or more capacitors.

13. The converter arrangement according to claim 1, wherein the first rectifier is a three-phase rectifier having three AC input poles.

14. The converter arrangement according to claim 1, wherein the second rectifier is a full-wave rectifier.

15. The converter arrangement according to claim 1, wherein the first rectifier and/or the second rectifier is a diode rectifier.

16. The converter arrangement according to claim 1, comprising:
a first rectifier switch between the AC input of the first rectifier and AC supply input lines of the first rectifier; and
a filter in series with the switch.

17. The converter arrangement according to claim 1, comprising:
a second rectifier switch between the at least one AC winding of the magnetic amplifier and AC supply input lines of the magnetic amplifier.

18. A method for charging a capacitance of a converter arrangement which includes a first rectifier having an AC input and a DC output with two DC output poles;
a capacitance connected between the DC output poles of the first rectifier;
a second rectifier having an AC input with two AC input poles and a DC output with two DC output poles, wherein the DC output of the second rectifier is connected between the DC output poles of the first rectifier; and
a magnetic amplifier having at least one control winding and at least one AC winding, wherein an alternating current through the at least one AC winding can be controlled by a direct current through the at least one control winding and wherein the at least one control winding of the magnetic amplifier is connected between the DC output poles of the first rectifier;
wherein the at least one AC winding of the magnetic amplifier is connected in series with the AC input of the second rectifier; the method comprising:
connecting the series connection of the at least one AC winding of the magnetic amplifier and the AC input of the second rectifier between two poles of an AC supply.

19. The method of claim 18, wherein the converter arrangement includes a first rectifier switch between the AC input of the first rectifier and AC supply input lines of the first rectifier; and
a filter in series with the switch; the method comprising:
switching off the first rectifier switch and switching on the second rectifier switch during charging of the capacitance.

20. The method of claim 19, comprising:
discontinuing charging of the capacitance when a voltage of the capacitance matches a threshold.

* * * * *